US010725468B2

(12) United States Patent
Pohl

(10) Patent No.: US 10,725,468 B2
(45) Date of Patent: Jul. 28, 2020

(54) BOUNDING-VOLUME BASED UNMANNED AERIAL VEHICLE ILLUMINATION MANAGEMENT SYSTEM

(71) Applicant: Intel IP Corporation, Santa Clara, CA (US)

(72) Inventor: Daniel Pohl, Puchheim (DE)

(73) Assignee: Intel IP corporation, Santa Clara, CA (US)

( * ) Notice: Subject to any disclaimer, the term of this patent is extended or adjusted under 35 U.S.C. 154(b) by 303 days.

(21) Appl. No.: 15/810,213

(22) Filed: Nov. 13, 2017

(65) Prior Publication Data

US 2019/0049944 A1  Feb. 14, 2019

(51) Int. Cl.
| G05D 1/00 | (2006.01) |
| G05D 1/10 | (2006.01) |
| B64C 39/02 | (2006.01) |
| B64D 47/02 | (2006.01) |
| G08G 5/00 | (2006.01) |
| B60Q 1/00 | (2006.01) |
| H05B 45/20 | (2020.01) |
| H05B 47/155 | (2020.01) |

(52) U.S. Cl.
CPC ............ *G05D 1/0027* (2013.01); *B60Q 1/00* (2013.01); *B64C 39/024* (2013.01); *B64D 47/02* (2013.01); *G05D 1/104* (2013.01); *G08G 5/0034* (2013.01); *G08G 5/0039* (2013.01); *G08G 5/0069* (2013.01); *H05B 45/20* (2020.01); *H05B 47/155* (2020.01); *B64C 2201/143* (2013.01)

(58) Field of Classification Search
CPC ........ G05D 1/0027; G05D 1/104; B60Q 1/00; B64C 39/024; B64C 2201/143; B64D 47/02; G08G 5/0034; G08G 5/0039; G08G 5/0069
USPC .......................................................... 701/3
See application file for complete search history.

(56) References Cited

U.S. PATENT DOCUMENTS

| 5,716,032 | A | * | 2/1998 | McIngvale | ............ | B64C 39/024 |
| | | | | | | 244/185 |
| 6,853,328 | B1 | * | 2/2005 | Guice | .................. | A01M 1/026 |
| | | | | | | 342/22 |
| 9,984,579 | B1 | * | 5/2018 | Harris | .................. | G05D 1/0676 |
| 10,325,505 | B2 | * | 6/2019 | Gao | ..................... | G05D 1/0011 |
| 10,414,494 | B2 | * | 9/2019 | Jourdan | ............... | G08G 5/0069 |

(Continued)

FOREIGN PATENT DOCUMENTS

| CA | CA-2957081 A1 | * | 2/2016 | .......... | A01B 79/005 |
| GB | 2502866 A | * | 12/2013 | | |
| WO | WO-2017177361 A1 | * | 10/2017 | ............ | H04W 4/024 |

*Primary Examiner* — Tuan C To
(74) *Attorney, Agent, or Firm* — Viering, Jentschura & Partner mbB

(57) ABSTRACT

Herein is disclosed a bounding-volume based unmanned aerial vehicle illumination management system comprising one or more processors, configured to define a plurality of bounding volumes within a region of unmanned aerial vehicle flight; determine a subset of unmanned aerial vehicles within a bounding volume according to an unmanned aerial vehicle flight plan; determine a combined lighting value of the subset of unmanned aerial vehicles according to an unmanned aerial vehicle illumination plan; and determine a surface illumination corresponding to the combined lighting value of one or more bounding volumes.

19 Claims, 8 Drawing Sheets

(56) References Cited

U.S. PATENT DOCUMENTS

| | | | |
|---|---|---|---|
| 2014/0249693 A1* | 9/2014 | Stark | B64C 39/024 701/2 |
| 2015/0066248 A1* | 3/2015 | Arbeit | G01C 21/20 701/2 |
| 2016/0171896 A1* | 6/2016 | Buchmueller | G08G 5/0008 701/3 |
| 2017/0039424 A1* | 2/2017 | Nerayoff | G06Q 20/145 |
| 2017/0057634 A1* | 3/2017 | Hunt | B64C 39/024 |
| 2017/0146344 A1* | 5/2017 | Clark | B64C 39/024 |
| 2017/0192418 A1* | 7/2017 | Bethke | G05D 1/0094 |
| 2017/0278410 A1* | 9/2017 | Byers | B64C 39/024 |
| 2017/0302838 A1* | 10/2017 | Yang | H04N 5/23229 |
| 2017/0323261 A1* | 11/2017 | Jones | B64C 39/024 |
| 2018/0016027 A1* | 1/2018 | Cheatham, III | B64D 9/00 |
| 2018/0053054 A1* | 2/2018 | Schultz | B64C 39/024 |
| 2018/0081056 A1* | 3/2018 | Ohtomo | G01S 17/86 |
| 2018/0129879 A1* | 5/2018 | Achtelik | G01C 5/00 |
| 2018/0144644 A1* | 5/2018 | Heinonen | G08G 5/0086 |
| 2018/0147998 A1* | 5/2018 | Ohtomo | B60R 11/04 |
| 2018/0265198 A1* | 9/2018 | Qiu | B64D 1/02 |
| 2018/0312274 A1* | 11/2018 | Kessler | B64D 47/06 |
| 2019/0011920 A1* | 1/2019 | Heinonen | G05D 1/101 |

\* cited by examiner

Defining a plurality of bounding volumes within a region of unmanned aerial vehicle flight 1001

Determining a subset of unmanned aerial vehicles within a bounding volume according to an unmanned aerial vehicle flight plan 1002

Determining a combined lighting value of the subset of unmanned aerial vehicles according to an unmanned aerial vehicle illumination plan 1003

Determining a surface illumination corresponding to the combined lighting value of one or more bounding volumes 1004

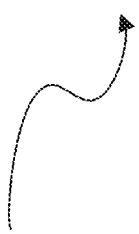

BOUNDING-VOLUME BASED UNMANNED AERIAL VEHICLE ILLUMINATION MANAGEMENT SYSTEM

TECHNICAL FIELD

Various aspects of the disclosure relate generally to the calculation and management of illumination from unmanned aerial vehicles ("UAV").

BACKGROUND

UAVs may be equipped with a lighting source, and one or more UAVs may be used to generate aerial illumination. For example, it is known to program a plurality of UAVs to utilize onboard lights for the performance of a UAV light show. During a UAV light show, the UAV light source may be employed for direct visualization, such as where a plurality of UAV lights create an image in the sky. It may also be desirable to determine the resulting ground illumination or illumination of other objects.

SUMMARY

Herein is disclosed a bounding-volume based unmanned aerial vehicle illumination management system comprising one or more processors, configured to define a plurality of bounding volumes within a region of unmanned aerial vehicle flight; determine a subset of unmanned aerial vehicles within a bounding volume according to an unmanned aerial vehicle flight plan; determine a combined lighting value of the subset of unmanned aerial vehicles according to an unmanned aerial vehicle illumination plan; and determine a surface illumination corresponding to the combined lighting value of one or more bounding volumes.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 10 shows a method for bounding-volume based light determination.

DESCRIPTION

Figure 1:
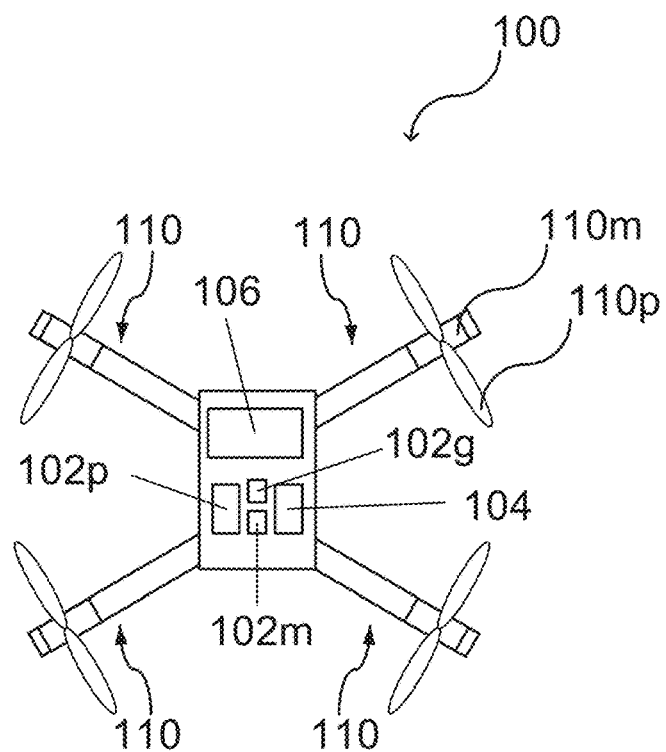
FIG. 1 illustrates an unmanned aerial vehicle in a schematic view.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit ("ASIC"), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

The unmanned aerial vehicle, according to various aspects, may include a support frame that serves as basis for mounting components of the unmanned aerial vehicle, such as, for example, motors, sensors, mechanic, transmitter, receiver, and any type of control to control the functions of the unmanned aerial vehicle as desired.

UAV light shows are becoming increasingly complex, featuring successions of multiple images, large numbers of UAVs, varying altitudes, varieties of light colors, and multiple directions of travel. Where it is desired to determine the illumination effect of the plurality of UAVs during the light show, and specifically how the plurality of UAVs will illuminate land or objects (such as buildings, trees, landscapes, attractions, water, etc.), it is known to use a light probing method to determine these calculations. The known light probing methods require sampling light at distinct points in space in all directions, and interpolating the sampled value with other distinct samples to estimate lighting at a given point. Given the large number of data points (owing to the increasing number of UAVs in a light show), calculation via the known light probing methods becomes impracticable or unworkable.

It is disclosed herein to associate UAVs with bounding volumes, to determine a combined light intensity or color of the UAV lights associated with a bounding volume, to attribute the combined light intensity or color to a point within the bounding volume, to calculate the resulting illumination pattern using the attributed combined light intensity or color from each bounding volume, and to adjust a flight plan accordingly to obtain a desired illumination pattern.

A bounding volume is a closed volume including one or more objects, to which a union of the objects within the bounding volume is attributed. The use of the word "volume" notwithstanding, bounding volumes may be two-dimensional or three-dimensional. For example, a two dimensional bounding volume may be depicted as a circle, whereas a three-dimensional bounding volume may be depicted as a sphere. Bounding volumes advantageously reduce computational complexity by combining data from a plurality of objects within the bounding volume into a single data point.

The unmanned aerial vehicle, according to various aspects, may include a camera gimbal having an independent two- or three-axis degree of freedom to properly track a target, e.g. a person or point of interest, with a tracking camera independently of an actual flight direction or actual attitude of the unmanned aerial vehicle. In some aspects, a depth camera may be used for tracking, monitoring the vicinity of the UAV, providing images to a user of the UAV, etc. A depth camera may allow associating depth information with an image, e.g., to provide a depth image. This allows, for example, providing an image of the vicinity of the unmanned aerial vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a depth map from the depth information provided by the depth images.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each propeller has at least one propeller blade and may include a plurality of blades. The propellers may be fixed pitch propellers.

FIG. 1 illustrates an unmanned aerial vehicle 100 in a schematic view, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110m and at least one propeller 110p coupled to the at least one drive motor 110m. The one or more drive motors 110m of the unmanned aerial vehicle 100 may be electric drive motors.

Further, the unmanned aerial vehicle 100 may include one or more processors 102p configured to control flight or any other operation of the unmanned aerial vehicle 100 including but not limited to navigation, image analysis, location calculation, and any method or action described herein. One or more of the processors 102p may be part of a flight controller or may implement a flight controller. The one or more processors 102p may be configured, for example, to provide a flight path based at least on an actual position of the unmanned aerial vehicle 100 and a desired target position for the unmanned aerial vehicle 100. In some aspects, the one or more processors 102p may control the unmanned aerial vehicle 100. In some aspects, the one or more processors 102p may directly control the drive motors 110m of the unmanned aerial vehicle 100, so that in this case no additional motor controller may be used. Alternatively, the one or more processors 102p may control the drive motors 110m of the unmanned aerial vehicle 100 via one or more additional motor controllers. The one or more processors 102p may include or may implement any type of controller suitable for controlling the desired functions of the unmanned aerial vehicle 100. The one or more processors 102p may be implemented by any kind of one or more logic circuits.

According to various aspects, the unmanned aerial vehicle 100 may include one or more memories 102m. The one or more memories may be implemented by any kind of one or more electronic storing entities, e.g. a one or more volatile memories and/or one or more non-volatile memories. The one or more memories 102m may be used, e.g., in interaction with the one or more processors 102p, to build and/or store image data, ideal locations, locational calculations, or alignment instructions.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include one or more sensors 106. The one or more sensors 106 may be configured to monitor a vicinity of the unmanned aerial vehicle 100. The one or more sensors 106 may be configured to detect obstacles in the vicinity of the unmanned aerial vehicle 100. The one or more sensors 106 may include, for example, one or more cameras (e.g., a depth camera, a stereo camera, a thermal imaging camera, etc.), one or more ultrasonic sensors, etc. The unmanned aerial vehicle 100 may further include a position detection system 102g. The position detection system 102g may be based, for example, on global positioning system (GPS) or any other available positioning system. Therefore, the one or more processors 102p may be further configured to modify the flight path of the unmanned aerial vehicle 100 based on data obtained from the position detection system 102g. The sensors 106 may be mounted as depicted herein, or in any other configuration suitable for an implementation.

According to various aspects, the one or more processors 102p may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102p may further include an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a flight velocity, a flight direction, etc., may be implemented in the one or more processors 102p and/or in additional components coupled to the one or more processors 102p.

Figure 2:
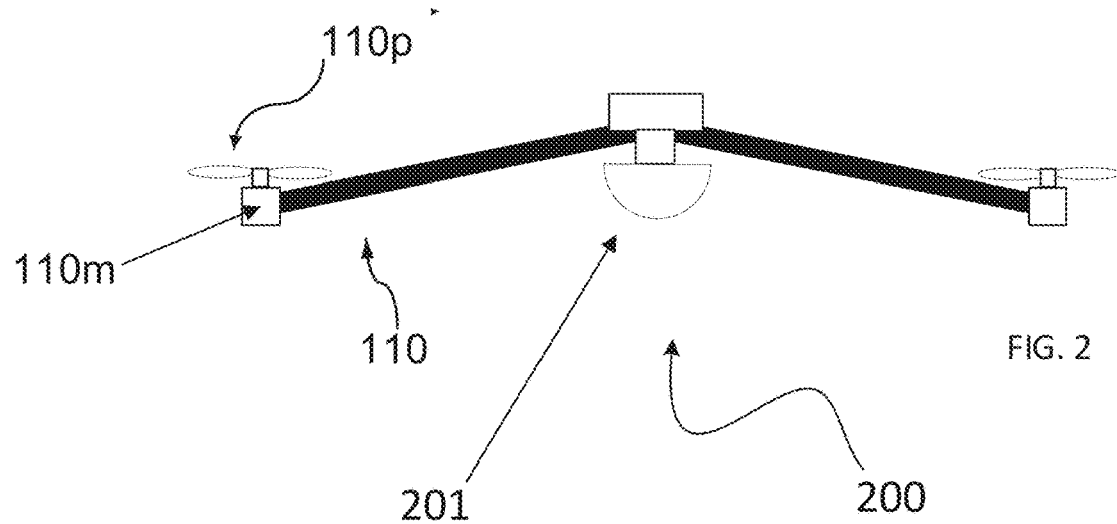
FIG. 2 shows a UAV equipped with a lighting source.

FIG. 2 shows a UAV equipped with a lighting source or lamp. In this case, the UAV of FIG. 1 is shown from a lateral view. This UAV is equipped with a lighting source or lamp 201, which, in this case, hangs beneath the UAV for visual appreciation of spectators from below. The light may be placed on any portion of the UAV, without limitation, and specific areas or directions of light may be selected based on the desired implementation. The light may be in a fixed position relative to the UAV, or the light may be hinged or otherwise moveably connected to the UAV.

Figure 3:
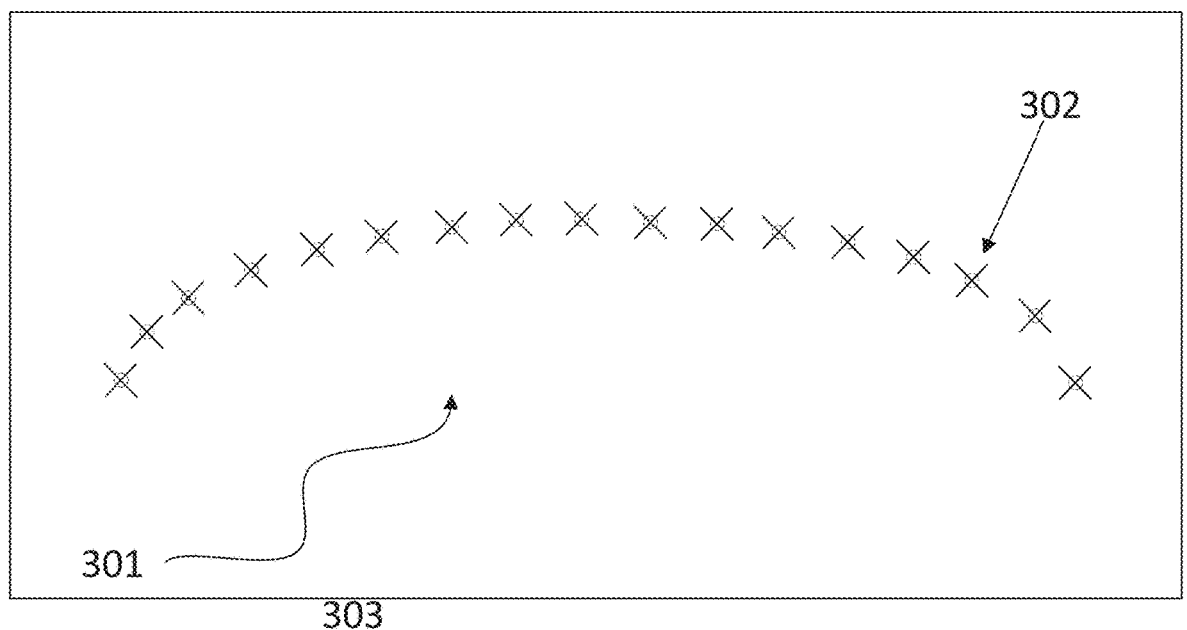
FIG. 3 shows a known method of configuring UAVs in a formation for a light show.

FIG. 3 shows a known method of configuring UAVs in a formation for a light show. It is generally known to cause a plurality of light-equipped UAVs to form one or more configurations in the context of a light show. During such a light show, the UAV lights may be understood as a pixel or point within the sky, and a plurality of pixels or points are arranged in desired formations or designs. Thus, the UAVs can be programmed to achieve specific, desired formations, and to utilize their lights within the formations, such that spectators appreciate the plurality of UAV lights as a shape, design, or word. In this case, the plurality of UAVs are programmed to reach a simple curve design 301. This curve design 301 includes seventeen individual UAVs. UAV 302 is depicted as the fifteenth UAV in the formation. Although the formation 301 includes a plurality of distinct points, when viewed from a distance, as would be common by spectators on the ground, this may be appreciated as a curve, rather than a mere series of points. A region for a UAV light show is depicted as 303.

Beyond merely functioning as a pixel, the UAV lamps radiate light energy, which will ultimately illuminate structures on the ground, or the ground itself. Beyond merely forming a series of pixelated shapes, it may be desirable or necessary to position UAVs, or otherwise modify their lights, to achieve desired ground illumination, or to avoid certain ground illumination. For example, it may be desirable for a specific portion of the ground to be illuminated with a bright white light. Alternatively, it may be desirable for a specific portion of the ground to remain dark. Furthermore, various colors of lights may be combined to reach desired hues of illumination, such as the desire to illuminate portions of the ground, or structures attached to the ground, in hues such as, but not limited to, orange, green, magenta, white, or any other hue created by combining a plurality of lights together.

Figure 4:
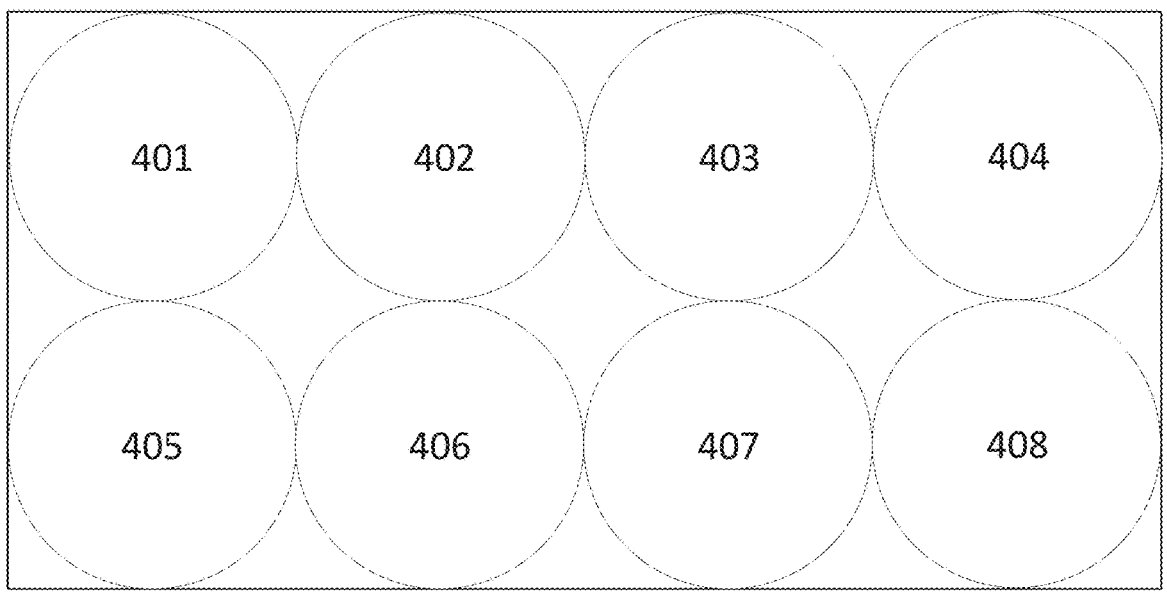
FIG. 4 shows a plurality of bounding volumes.

FIG. 4 shows the designation of a region for flight of unmanned aerial vehicles into a plurality of bounding volumes. In this case, the bounding volumes are arranged in a 2×4 grid of eight adjacent spherical regions, 401-408. Although these regions are spherical, they are depicted for simplicity as two-dimensional circular regions. For demonstrative purposes, spherical bounding volumes have been chosen; however, other bounding volume shapes may be used, including, but not limited to cubic bounding volumes, ellipsoidal bounding volumes, cylindrical bounding volumes, capsular bounding volumes, or otherwise. The bounding volumes may define a space that includes one or more UAVs. The lights corresponding to the one or more UAVs within the bounding area will be grouped and/or averaged together and will be considered as a singular light corresponding to the bounding area. That is, each bounding area will have a center or focal point, and the corresponding grouped and/or averaged light from the one or more UAVs within the bounding area will be attributed to the center or focal point. Although the bounding volumes are depicted in a 2×4 grid arrangement, this is chosen for demonstrative purposes, and the bounding volumes may be arranged in any other arrangement suitable for the UAV light show region 303. The grid arrangement of the bounding volumes may be, but is not limited to, a 2×2 grid, a 2×4 grid, a 4×4 grid, a 4×6 grid, a 6×6 grid, a 6×8 grid, a 8×8 grid, or otherwise.

Figure 5:
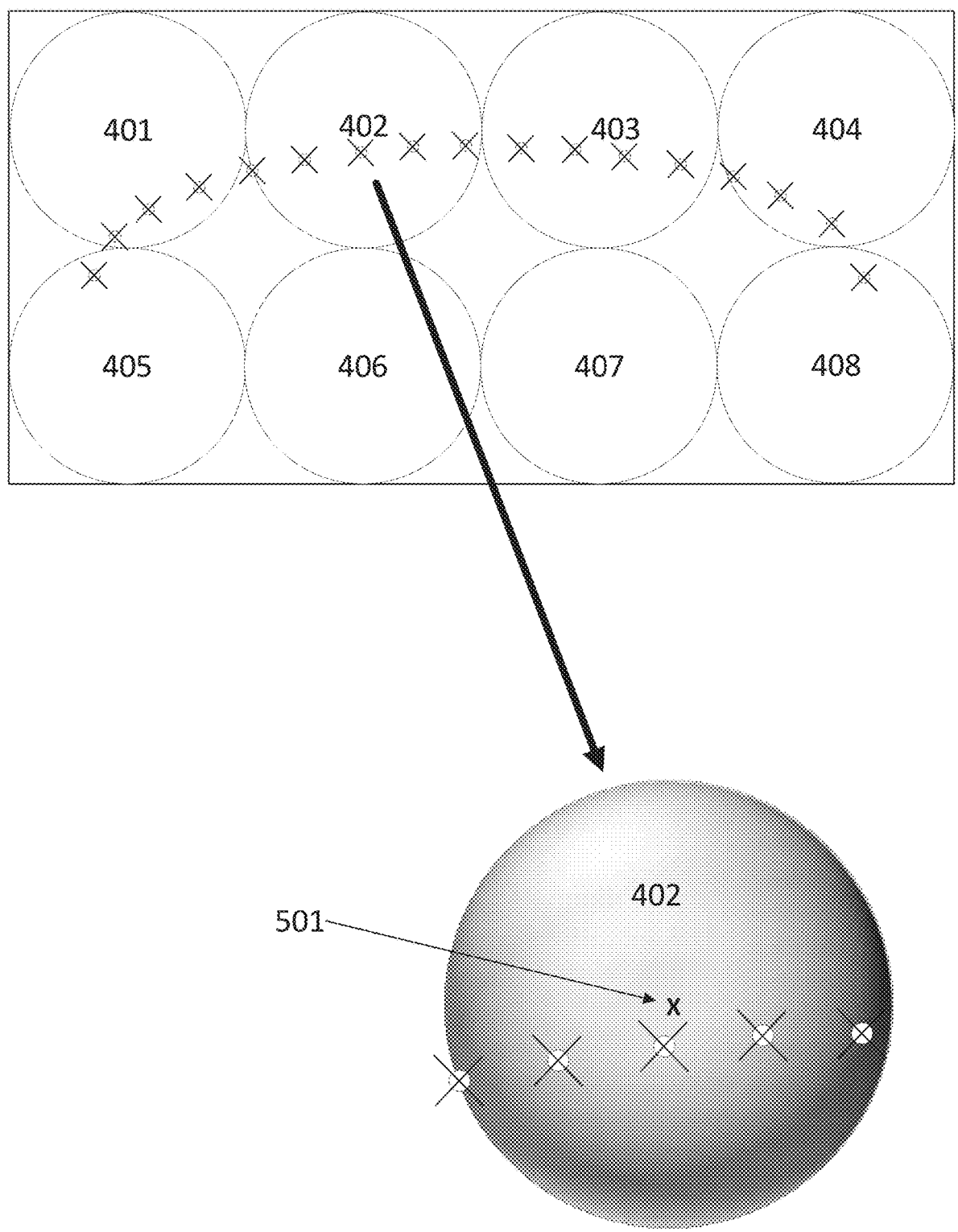
FIG. 5 shows bounding volumes corresponding to a UAV arrangement.

FIG. 5 shows bounding volumes 401-408 as they correspond to the UAV arrangement for the light show 301. In this case, the arrangement of the UAVs for the light show 301 corresponds to six of the eight bounding volumes, 401-404, 405, and 408. Bounding volumes 406 and 407 do not correspond to any UAVs within the UAV light show formation 301. The bottom right of FIG. 5 shows an expanded view of bounding volume 402 and the five UAVs that correspond to this bounding volume. Moreover, bounding volume 402 has been assigned a focal point 501, to which the combined light sources of bounding volume 402 will be attributed. Each bounding volume will be assigned its own focal point, and each focal point will correspond to the UAVs attributable to the particular bounding volume. In this case, the combined brightness of the five UAVs within the volume of bounding volume 402 will be attributed to focal point 501. Moreover, the hues of the five lights within the volume of bounding volume 402 will be combined to form a combined lighting hue, the combined lighting hue being attributable to the focal point 501. For example, where three of the five UAVs associated with bounding volume 402 are programmed to emit blue light, and two of the five UAVs associated with bounding volume 402 are programmed to emit red light, the combined lighting hue attributable to the focal point 501 may be a magenta light.

Figure 6:
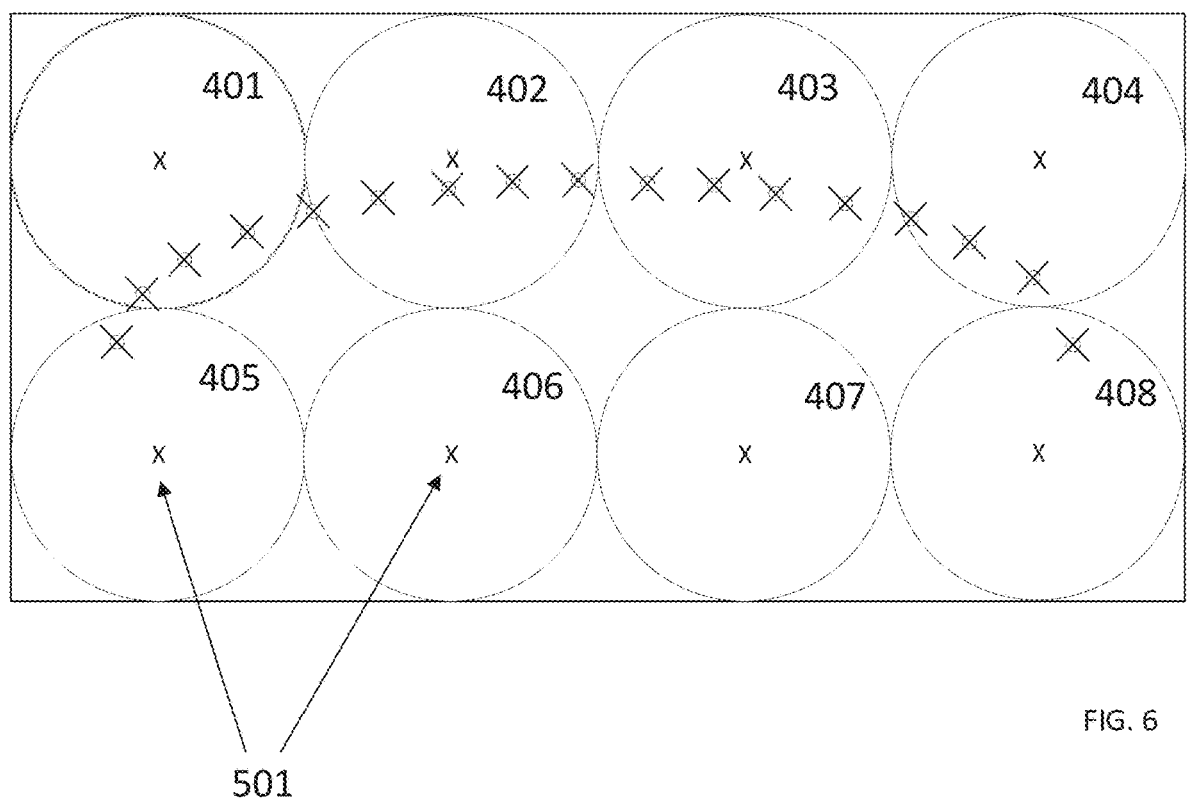
FIG. 6 shows a 2×4 bounding volume arrangement with focal points.

FIG. 6 shows the 2×4 bounding volume arrangement including bounding volumes 401-408, along with the corresponding UAVs for the UAV light show 301, wherein each bounding volume is also assigned a focal point 501 to which the combined brightness and combined hues of the corresponding UAVs are attributed. Once again, the bounding volumes in this case are depicted two dimensionally for demonstrative simplicity; however, it is anticipated that the bounding volumes will be three-dimensional regions, such as spheres, cubes, cylinders, ellipsoids, or otherwise. Alternatively, where the light show is two-dimensional, such that the UAVs are programmed to reach shapes within a single plane, the bounding volumes may also be two-dimensional. Such two-dimensional shapes may be, but are not limited to, circles, squares, rectangles, triangles, hexagons, or octagons.

Figure 7:
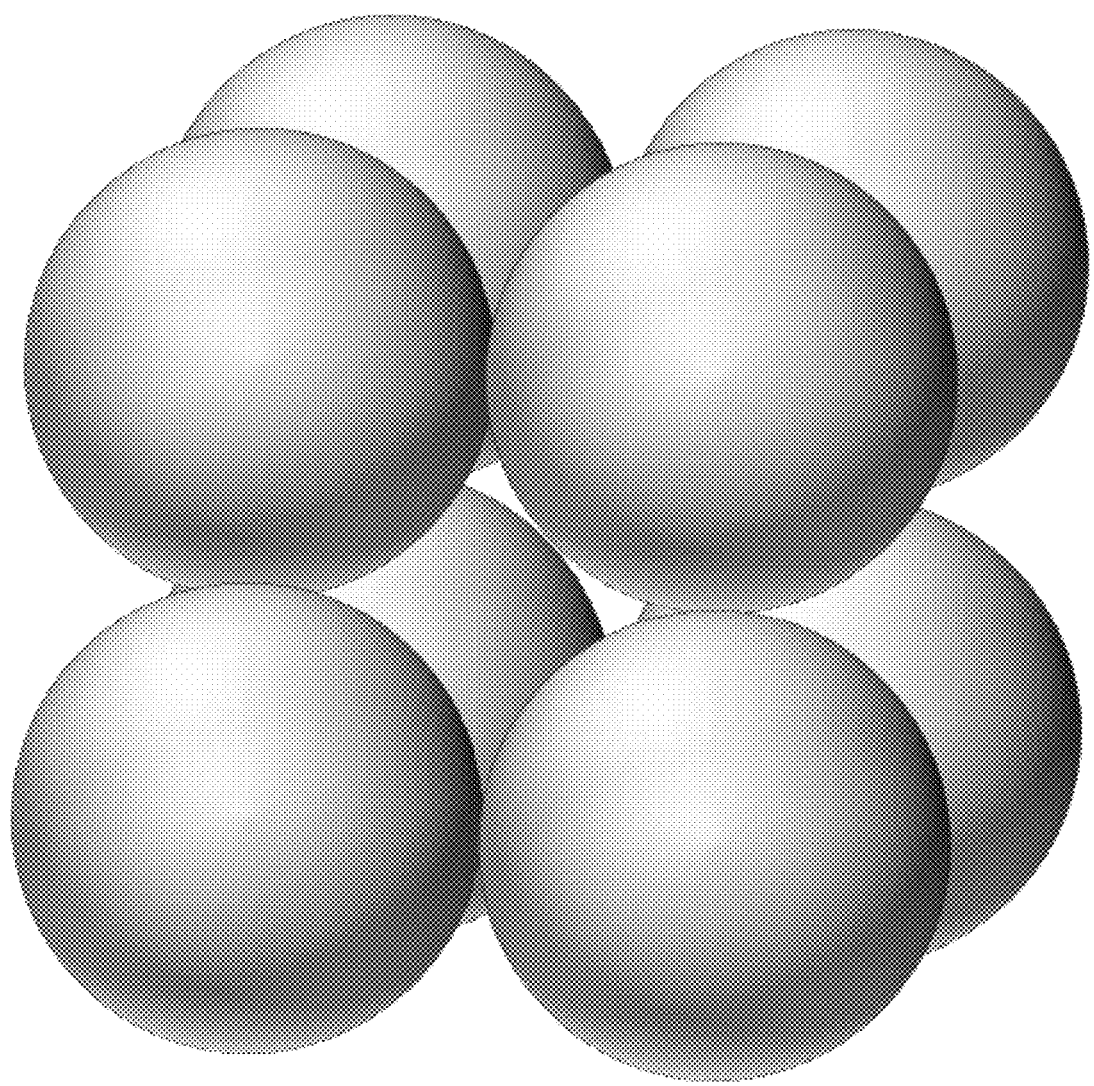
FIG. 7 shows a 2×2×2 bounding volume arrangement.

FIG. 7 shows an alternative bounding volume arrangement, wherein the bounding volumes include three-dimensional spheres in a 2×2×2 arrangement. Although the bounding volumes themselves may be three-dimensional, as depicted by the spheres in FIG. 5 and FIG. 7, the bounding volumes may be placed within a single grid layer (as in FIG. 5) or within a three-dimensional, stacked grid layer (as in FIG. 7). That is, to the extent that the UAVs within the light show are not programmed to reach positions within a singular plane, but rather programmed to reach positions within three directional axes, the bounding volumes may be configured in at least two different manners. First, the bounding volumes may be selected to be of sufficient size that a single axial measurement of a bounding volume encompasses the entirety of movement within a single axis of the light show. By way of example, where a light show includes significant movement within an x-axis and a y-axis, but only limited movement within a z-axis, a single layer of bounding volumes may be placed on a grid as described above, whereby the one layer or the bounding volumes are large enough to accommodate the maximum movement of a UAV along a z-axis. Alternatively, the bounding volumes may be selected with a size less than the distance of movement within the smallest axis of movement, such as less than the length of movement along the z-axis, which may require multiple layers of bounding volumes. Accordingly, the bounding volumes in FIG. 7 are depicted as a 2×2×2 grid configuration. This is depicted for simplicity and is not intended to be limiting. The bounding volumes may be placed in a 2×2×2 grid, a 3×3×3 grid, a 4×4×4 grid, or any other grid configuration to cover the volume of a light show region.

Figure 8:
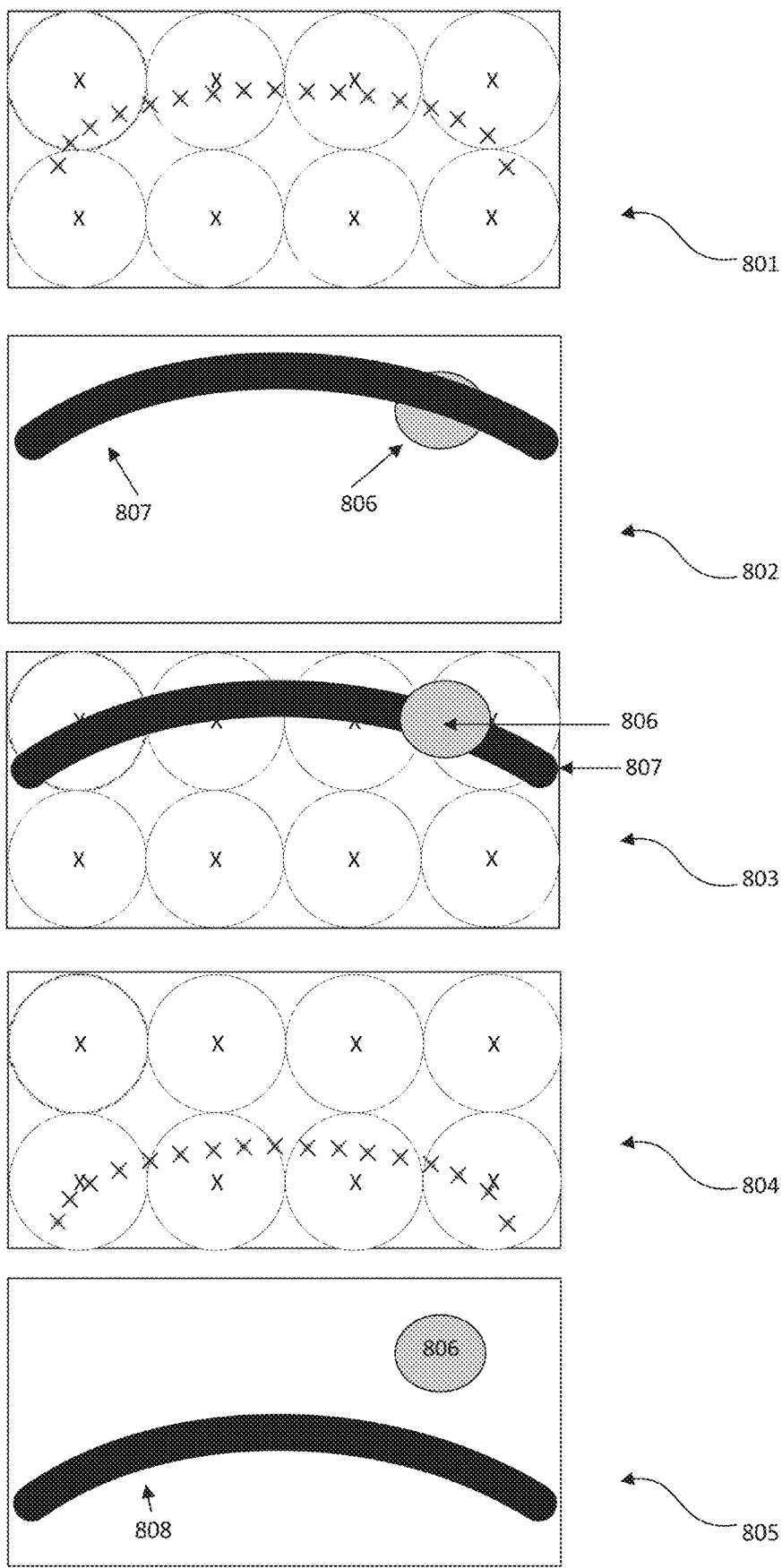
FIG. 8 shows an adjustment of a flight pattern to achieve a desired illumination pattern.

FIG. 8 shows an adjustment of a flight plan to achieve a desired illumination pattern. In 801, the UAV flight plan for a light show according to FIG. 5 is depicted. In 802, an estimated illumination pattern with a desired region of non-illumination is depicted. In 803, an estimated illumination pattern and a desired region of non-illumination relative to a plurality of bounding volumes is depicted. In 804, a revised flight pattern is depicted. In 805, a revised illumination pattern is depicted. In 802, a region 806 is depicted, wherein it is desired that region 806 will not be illuminated by the UAV light show, for which an area of illumination is depicted as 807. As shown in 803 where the estimated illumination is calculated relative to the bounding volumes, the estimated illumination area corresponds to the upper row of four bounding volumes. Accordingly, the upper four bounding volumes will each yield a single point of an estimated color and/or light brightness. In this case, the rightmost bounding volume correlates largely with an area for which illumination is undesired 806, which signals that the light show region may require adjustment to avoid illumination of 806. Where a region that is preferably not illuminated is anticipated as being illuminated by the light show flight plan, it is possible to revise the light show flight plan to achieve the desired illumination pattern. In 804, the flight plan has been amended such that the location of the UAVs have been changed. They can be plainly seen that the UAVs in 801 primarily inhabited the upper row of bounding volumes, whereas the UAVs in 804 primarily inhabit the lower row of bounding volumes. This depicts a corresponding change in the flight plan. In 805, a change in the estimated illumination is depicted. Here, region 806 remains static, but the anticipated area of illumination 808 has shifted to a new location, such that it is no longer anticipated that the UAV light show will illuminate region 806. Amendments to the flight plan to achieve a desired illumination pattern are not limited to a shift in the location of UAVs, but rather may include at least one of shifting the UAVs, changing a shape of the UAV pattern, lengthening or shortening a pattern of the UAVs, rotating a pattern of the UAVs, changing the concentration of the UAVs, changing lighting instructions for the UAVs, or changing lighting color for the UAVs.

Figure 9:
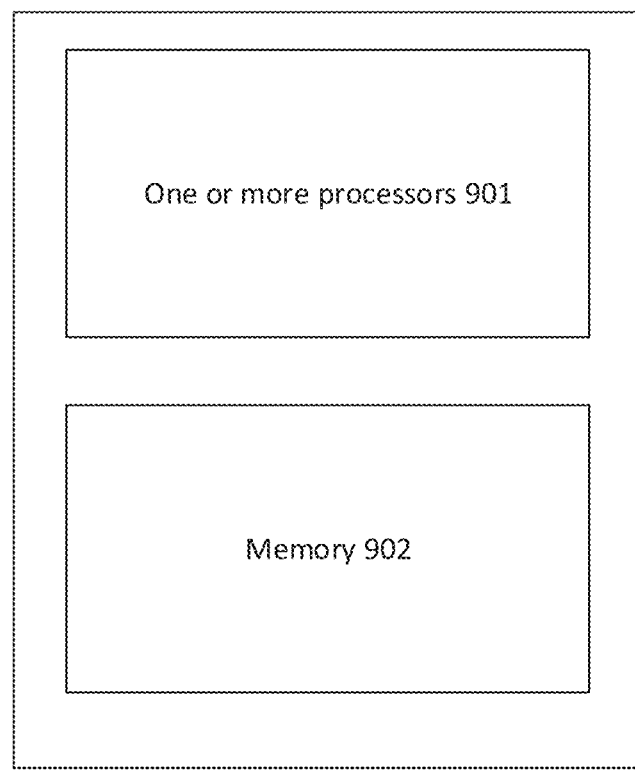
FIG. 9 shows a bounding-volume based light determination and UAV control system.
Figure 9:
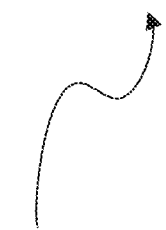

FIG. 9 shows a bounding-volume based unmanned aerial vehicle illumination management system 900 including one or more processors 901, configured to define a plurality of bounding volumes corresponding to a region of unmanned aerial vehicle flight; determine a combined lighting value for a bounding volume; estimate a surface illumination corresponding to the combined lighting value; and modify an unmanned aerial vehicle flight plan or lighting instruction to cause an estimated surface illumination to approximate a desired surface illumination value. The bounding-volume based unmanned aerial vehicle illumination management system may further comprise a memory 902, configured to store at least one of a flight plan and a map.

FIG. 10 shows a method of bounding-volume based unmanned aerial vehicle illumination management 1000 comprising defining a plurality of bounding volumes within a region of unmanned aerial vehicle flight 1001; determining a subset of unmanned aerial vehicles within a bounding volume according to an unmanned aerial vehicle flight plan 1002; determining a combined lighting value of the subset of unmanned aerial vehicles according to an unmanned aerial vehicle illumination plan 1003; and determining a surface illumination corresponding to the combined lighting value of one or more bounding volumes 1004.

It is known to equip a plurality of UAVs with a lamp and to cause the UAVs to achieve certain combined shapes during a UAV light show. The light shows may cause the UAVs and corresponding lights to form shapes, letters, or words in the sky. Such UAV light shows require advance planning, wherein absolute coordinates are determined for each UAV, such that the combined effect of the UAVs reaching the absolute coordinates results in an appreciable display or image from the perspective of a viewer. The lamp or lamps on a UAV may be seen as a point or pixel, such that the combined UAV formation includes a plurality of pixels, which, from the vantage point of a viewer on the ground, appears to form a shape or image. In addition to any images formed by a plurality of pixels or points, the lights from the UAVs may also illuminate the ground or other objects. It may be desirable to calculate the illumination on the ground or other objects at one or more points during the UAV light show.

Such calculation of illumination prevents a number of logistical problems. A UAV light show may include a rather large plurality of UAVs. The number of UAVs in a UAV light show is theoretically unlimited. In practice, the number of UAVs for a light show may easily exceed one thousand UAVs. Even assuming a single light source on each UAV, calculation of ground or object illumination in such an instance requires calculation of one thousand moving light sources. Known methods of such calculation require enormous processing resources and may be impossible or impracticable where the UAV light sources exceed the available processing power.

It is herein disclosed to simplify processing of ground or object illumination within a UAV light show by grouping the UAVs within a plurality of bounding volumes, and combining or averaging light intensity and/or hue for each bounding volume. By simplifying the calculation using bounding volumes, the flight plan for a light show may be altered in order to achieve a desired ground or object illumination, or to avoid an undesired ground or object illumination. Particularly where processing power is a limiting factor, the use of bounding volumes may allow tailoring of a flight plan to achieve the desired ground or object illumination.

Such bounding volume-based ground or object illumination calculation may begin with a definition of a light show region. The light show region may be a two-dimensional or three-dimensional region in which a plurality of UAVs are programmed to fly and display light in the context of a light show. It is expressly anticipated that some light shows may be two-dimensional, while other light shows may be three-dimensional. Where a two-dimensional light show is anticipated, a light show region may also be two-dimensional, or alternatively may be three-dimensional. Where a three-dimensional light show is anticipated, the light show region may be three-dimensional.

The use of fewer bounding volumes is expected to result in reduced complexity of data calculation. However, because fewer bounding volumes may require bounding volumes of larger sizes, this may result in a trade-off of decreased data accuracy. Therefore, the number of bounding volumes may be determined by any number of factors, including, but not limited to, the capacity for processing data and/or the tolerance for data accuracy.

Upon determining a light show region, a plurality of bounding volumes may be ascribed to the light show region. The configuration of bounding volumes is highly customizable and may be selected based on a balance between available processing power and a requirement for accuracy of calculations. The bounding volumes may be ascribed to a grid within the light show region. Such a grid may be one-dimensional, two-dimensional, or three-dimensional. For example, and without limitation, a grid of bounding volumes may be a 1×4 grid (one-dimensional), a 4×4 grid (two-dimensional), or a 4×4×4 grid (three-dimensional).

Once a bounding volume is ascertained, the area or volume of the bounding volume may be assessed for the presence of one or more UAV lights. The UAV lights attributable to a given bounding volume may be grouped to assess at least brightness and/or hue. Because a plurality of bounding volumes are used, it is likely that fewer than all UAVs within a light show will be within a single bounding volume (although this may occur where the UAVs are closely concentrated within a comparatively small area), and therefore the UAVs are likely to be distributed within two or more bounding volumes. The UAVs may be grouped into UAV subsets, wherein each subset corresponds to the UAVs that are located within a given bounding volume.

Regarding brightness, the brightness of each UAV light within the bounding volume may be added to determine a combined brightness. This may be measured in lumens or watts or any other desired measurement. The brightness of each corresponding UAV light will be added to determine a combined brightness for the bounding volume.

Regarding hue, the hues of each UAV light within the bounding volume may be combined to determine an effective combined hue. In some installations, the UAVs may be equipped with one or more lights of a single color, such as a white light. Other installations may equip the one or more UAVs with lights of various colors, such that a variety of colors are represented within the UAV light show. The UAV lights may also be configured to change colors, such that a single light may produce a first color during one portion of the light show, and a second color during a different portion of the light show. Thus, the combined hues of the lights corresponding to a bounding volume may be calculated for a specific time, taking into account the particular lighting hue and brightness for that time.

Each bounding volume will be assigned a center point or focal point, wherein a center point is expected to be within the center of each bounding volume, but wherein the focal point may be a center point, or alternatively, the focal point may be assigned to any portion on or within the bounding volume. The combined brightness and hue will be attributed to the center point or focal point within the bounding volume. For simplification of data calculation, the center point or focal point may be a single point including an x-coordinate and a y-coordinate, or a single point on a three dimensional scale including an x-coordinate, a y-coordinate, and a z-coordinate.

By assigning the lights corresponding to one or more UAVs within a bounding volume to a specific center point or focal point within the bounding volume, the number of data points to assess may be dramatically reduced. In any event, assuming that each UAV within a light show is assigned to a bounding volume, the number of data points to be calculated to determine a ground or object illumination is reduced from the number of UAVs within a light show including an illuminated light to the number of bounding volumes including a lighted UAV. By way of example, where one thousand UAVs are employed for a UAV light show, and where the thousand UAVs have been attributed to a 4×4 bounding volume grid, the number of data points is reduced from 1000 to 16. This results in a significant simplification of calculations to determine ground or object illumination. It is anticipated that the simplified calculations will result in a reduction of processor requirement and/or increased speed of calculation.

Where, for example, a bounding volume in the shape of a sphere is used, the bounding volume will possess both a center and radius. Without limitation, bounding volumes may be aligned such that the distance between one bounding volume and an adjacent bounding volume is the sum of their radii. This principle may be extended to any shape, such that, for example and without limitation, two adjacent cubic bounding volumes would be placed in a connected fashion with sides touching, such that a distance between their center points is twice the shortest distance from their center point to a face of the cube.

The simplified data points corresponding to the bounded regions are used to determine ground and/or object illumination. This may be achieved by calculating the light brightness from the center or focal region of the bounding volume. A person skilled in the art will appreciate a variety of methods for determining illumination on the ground or objects from a lighting source within the air. Generally, however, it is anticipated that the UAV lighting sources will generally be pointing downward, in the direction of earth. The UAV lighting sources will generally cause a diffuse or spread light to travel downward, where it will illuminate an area or region beneath the UAV and extending outward away from that region. Where lights from multiple UAVs illuminate the same region, the brightness of the illumination will increase correspondingly with a number of UAVs providing light to that area. Similarly, with respect to hue, the color or hue of the combined lights from a plurality of UAVs will be appreciated on the ground or on objects as the combined hue of these lights. It thus may be calculated what the combined hue may be as the lights strike the ground or other objects. A plurality of hues may combined to form a different color than the combining hues. A plurality of lights at varying hues may combine to form a white light.

Because UAVs are generally expected to travel or hover such that the width of the UAV is generally parallel to the ground, it is generally anticipated that the angle of light emission from a fixed light will remain generally static. That is, where a light is a fixed in a non-movable fashion to a UAV, the angle of that light's illumination is expected to be relatively consistent throughout the UAV light show. It is expressly anticipated that the distance between the UAV light and the ground or illuminated object may change throughout the UAV light show, as the UAV may be programmed to travel to a higher or lower altitude. Where this occurs, the region of the ground or object illuminated by the light may change, as the area of diffusion will be affected by the distance between the light and the illuminated area.

According to one aspect of the disclosure one or more UAVs may be equipped with a movable or adjustable light. Where this occurs, the light may be movably affixed to the UAV, such that the light could swivel or be angled to achieve an alternative illuminating angle. Where this occurs the difference in angle may be ignored, and the light may be simply grouped within the remaining UAVs within the bounding volume. Alternatively, the illuminating angle may be considered by determining the region of the ground or the object that will be illuminated by the light, considering the illuminating angle, the distance between the light and the ground or illuminated object, and/or the degree of light diffusion or spread. Where a plurality of lights have a same or similar illuminating angle, these lights may be grouped together to determine a combined illuminating region.

In the context of a UAV light show, the UAVs will be preprogramed with a UAV flight plan. The UAV flight plan may be formulated in any desired manner but includes at least data to cause one or more UAVs to reach one or more flight destinations. A UAV flight plan may include a plurality of aerial destinations along with a timing to reach each destination. The UAV flight plan may include a timing to spend at each UAV destination. A plurality of UAVs operating according to one or more UAV flight plans may synchronously reach coordinated destinations to display designs, words, or patterns in the sky, or to produce a desired surface illumination.

The UAVs will be preprogrammed with a UAV lighting plan to control one or more UAV lights. The UAV lighting plan specifies for UAV lights whether the lights is on or off, the percent of lighting power (dimming), and/or the light color. The power may be specified within the lighting plan relevant to a light show timing, such that a plurality of power levels and/or lighting colors are specified in an ordered series, and a transition from one series element to the next occurs in accordance with a timing or a timed schedule.

The bounding-volume based unmanned aerial vehicle illumination management system may include a memory onto which a map or image is stored. The map may be a ground region in a vicinity of the UAV light show. The map may depict an area beneath or generally surrounding a planned UAV light show. The map may be a conventionally available map, such as a map available to the public. The map may be a satellite image of a region beneath or otherwise corresponding to the UAV light show.

The memory may further comprise a UAV flight plan for a UAV light show. Because UAV light shows require coordination of UAV flight and illumination, flight coordinates for a UAV light show are typically prepared in advance and known prior to the initialization of a light show. The UAV light show may be stored in one or more UAV flight plans, which may specify one or more coordinates for a plurality of UAVs in a UAV light show. The flight plan may identify a UAV within the light show and provide one or more flight coordinates for said UAV, along with a timing for each flight coordinate. The flight plan may comprise such coordinates for a plurality of UAVs, such that the flight plan may reveal the various shapes and timings associated with the plurality of UAVs. This data may be stored in memory, such that it is accessible to the one or more processors, and such that it may be changed or amended by the one or more processors.

It may be desirable for various land regions or objects to be illuminated, or not to be illuminated, in the context of a UAV light show. The combined regions of desired illumination and desired non-illumination are known as a desired light illumination pattern. Where it is desired for a land region or object to be illuminated, a maximum or minimum illumination level may also be desirable. The device and methods described herein permit a calculation of the resulting illumination based on a UAV light show configuration. Where a resulting illumination pattern is undesirable (such as where an area to be illuminated is not eliminated, or where an area not to be illuminated is illuminated) the flight plan may be changed to achieve the desired illumination pattern. For example. It is anticipated that a UAV light show will have one or more audience observers. It may be desirable not to illuminate the audience observers so as to prevent glare, blinding, or eyestrain. Alternatively, for dramatic impact, it may be desirable, even in brief periods, to illuminate the audience members. Thus, it can be assessed when, and to what extent, a UAV light show will result in audience observer illumination. Similarly, it may be undesirable to illuminate certain ground areas or objects, such as areas that are unattractive or to which an audience's attention may not desirably be directed. This may occur, for example, in the context of an amusement park, wherein certain portions of the amusement park property are not accessible by amusement park guests, and it may be undesirable to illuminate said in accessible portions of the property. It may be desirable to create colors or shaded regions on the ground, objects, or nearby structures.

Where it is determined that a portion to be illuminated will be insufficiently illuminated given a current flight plan, or where a portion not to be illuminated is likely to be illuminated given the current flight plan, the flight plan it may be changed to accommodate the desired illumination schema. Changes in the flight plan may include at least any of the following procedures: increasing or decreasing a width of the design; increasing or decreasing a length of the design; increasing or decreasing an altitude of the design; rotating a design; shifting a location of a design; and changing a designed to accommodate a desired illumination pattern. Because one or more maps may be stored in the memory, areas to be illuminated, or not to be illuminated, may be identified on the maps and compared to an expected illumination profile from a programmed UAV light show. Where the anticipated illumination pattern contrasts with a desired illumination pattern (such as where an area not to be illuminated will be illuminated, or an area to be illuminated will not be illuminated) the flight plan may be changed as described herein.

It may also be desirable to modify the flight plan to achieve a desired hue at a given location or on a given object. At least for static purposes, it may be desirable to illuminate a specific object in a specific hue. For example, it may be desired to illuminate a Ferris wheel in a magenta hue. Where this is desired, the flight plan and corresponding UAV colors can be assessed to determine the colors of illumination of the Ferris wheel. Where the Ferris wheel will be illuminated in a color other than purple, the flight plan it may be rearranged to cause the resulting illumination to be a magenta illumination. Alternatively, the lighting configuration may be changed, such that light with a first color is substituted with light for a second color, such that the desired illumination hue can be obtained.

The plurality of bounding volumes may be arranged in any desired configuration. Without limitation, the bounding volumes may be selected based on at least processor resources or a desired threshold of data accuracy. According to one aspect of the disclosure, the bounding volumes may be arranged in a grid formation. The grid formation may be two-dimensional or three-dimensional. Where a grid formation is two-dimensional, the center or focal points of the bounding volumes will be arranged within a singular plane. It is anticipated that the bounding volumes themselves may be three-dimensional, and therefore even where the focal points are arranged within a singular plane, the bounding volumes themselves may be three-dimensional and thus may include length width and depth. The bounding volumes may be arranged in a three-dimensional pattern, wherein multiple grids of bounding volumes are stacked upon one another.

Where the bounding volumes are arranged within a single grid, they may be arranged in any grid configuration desired. Without limitation, the grid formations may be 2×2, 3×3, 4×4, 2×3, 2×4, or 3×4. Where the bounding volumes are arranged within multiple grids, they may be arranged in any grid configuration desired by adding a third dimension to the two-dimensional formations, such as 2×2×2 or 4×4×4, or otherwise.

The bounding volumes may be any desired shape. Throughout this disclosure, the bounding volumes are depicted as circles or spheres; however, they may be any desired shape, including, but not limited to squares, cubes, boxes, rectangles, ellipsoids, capsules, or cylinders.

Each UAV light show includes one or more flight plans for the corresponding UAVs. A flight plan may include a plurality of coordinates within a two-dimensional or three-dimensional space, in which the UAV should fly. The flight plan may further include a timing for reaching the various coordinates, such that the UAV can be instructed to move from a first coordinate to a second coordinate at a desired time. The changing from a first coordinate to a second coordinate may be performed in conjunction with a plurality of other UAVs.

The flight plan may further include instructions for the UAV's illumination source. As described above, it is anticipated that each UAV within the light show will have at least one lamp to provide light/illumination within the context of the light show. As described herein, the light may be turned on or off, deemed, tilted or angled, and/or caused to change color. The flight plan may include instructions to set or change any of these attributes.

The light produced by the lamps of the UAVs corresponding to a bounding volume may be grouped to form a combined lighting value. According to one aspect of the disclosure, the combined lighting value may be a combined brightness, which may be a summation of the magnitude of light output by this plurality of lamps corresponding to the bounding volume. Such a summation of brightness may be measured in lumens or watts or in any other desired format.

According to another aspect of the disclosure, the combined lighting value may be an average brightness, which may be an average of the magnitude of light output by the plurality of lamps corresponding to the bounding volume.

According to another aspect of the disclosure, the combined lighting value may be a lighting color or hue. In this case, the color or hue of the lamps of the UAVs corresponding to a bounding volume may be assessed for a combined color. Such a calculation may generally follow the known additive properties of light. For example, it is known that a red light and a green light are perceived as yellow, and a green light and a blue light are perceived as cyan. So too can the lighting colors from the lamps in a given bounding volume be combined and a final perceived color determined.

Calculating a perceived color within a bounding volume may significantly simplify calculation. Lamps in different locations may illuminate the ground differently, such that a first lamp illuminates a first portion of the ground, a second lamp eliminates a second portion of the ground, and where the first and the second portion of the ground partially overlap. Such calculations may become increasingly unworkable as the number of lamps increases, and even more so where the lighting sources are in motion. By combining the lamps within a bounding volume to form a single perceived light source and color, the number of light sources to calculate foreground illumination becomes reduced from the number of activated lamps within the light show to a maximum of the number of bounding volumes. In a UAV light show of one thousand UAVs, and wherein the bounding volumes are arranged in a 4×4 grid, the number of lighting points is decreased from as many as one thousand lighting points to a maximum of sixteen lighting points. This is a substantial savings in processor resources.

Once the combined lighting values (including a combined perceived hue and/or either a cumulative lighting brightness or an average lighting brightness) is obtained, the combined lighting values will be ascribed to the focal or center point of each bounding volume, such that the combined lighting values for a given bounding volume correspond to the combined lighting values for the UAVs located within the bounding volume. The data points from these combined lighting values will then be assessed to determine an estimated surface illumination value, wherein the estimated surface illumination value is an illumination value for a given portion of land or an object.

The surface illumination should be broadly understood to be any illuminated area or thing. In the context of a UAV light show, surface illumination may occur on land, water, or any structure otherwise connected to land or water. Surface illumination can also occur on intangible objects capable of reflecting light, such as fog, mist, smoke, or steam. Surface illumination may also occur on airborne objects, such as other UAVs, banners, balloons, planes, persons, or otherwise.

Bounding volumes may be a shape that, when combined with all other bounding volumes, includes less than the entire region of a UAV light show. For example, where bounding volumes are spherical, the bounding volumes may be placed on one or more grids such that they intersect; however, given the nature of adjacently placed spheres, regions between the bounding volumes, and thus not within a bounding volume, will be present. Where a UAV within a light show is located, or scheduled to be located within such a region not within a bounding volume, the one or more light sources corresponding to the UAV may be addressed in any manner desired. Options to address such a UAV light include, but are not limited to, ascribing the UAV light to the nearest bounding volume; calculating the UAV light as if it were a bounding volume data point; or ignoring the UAV light.

The following examples pertain to various aspects of the disclosure as described herein:

In Example 1, a bounding-volume based unmanned aerial vehicle illumination management system is disclosed, comprising one or more processors, configured to define a plurality of bounding volumes within a region of unmanned aerial vehicle flight; determine a subset of unmanned aerial vehicles within a bounding volume according to an unmanned aerial vehicle flight plan; determine a combined lighting value of the subset of unmanned aerial vehicles according to an unmanned aerial vehicle illumination plan; and determine a surface illumination corresponding to the combined lighting value of one or more bounding volumes.

In Example 2, the bounding-volume based unmanned aerial vehicle illumination management system of claim 1 is disclosed, further comprising a memory, configured to store at least one of a flight plan and a map.

In Example 3, the bounding-volume based unmanned aerial vehicle illumination management system of claim 1 or 2 is disclosed, wherein the one or more processors are further configured to modify the unmanned aerial vehicle flight plan or the unmanned aerial vehicle lighting plan to cause an estimated surface illumination to approximate a predetermined surface illumination.

In Example 4, the bounding-volume based unmanned aerial vehicle illumination management system of claim 3 is disclosed, further comprising flying an unmanned aerial vehicle according to the modified unmanned aerial vehicle flight plan or the modified unmanned aerial vehicle lighting plan.

In Example 5, the bounding-volume based unmanned aerial vehicle illumination management system of any one of claims 1 to 4 is disclosed, wherein the one or more processors are further configured to associate the combined lighting value for the bounding volume with a bounding volume center or focus.

In Example 6, the bounding-volume based unmanned aerial vehicle illumination management system of claim 5 is disclosed, wherein the bounding volume center or focus is a single point.

In Example 7, the bounding-volume based unmanned aerial vehicle illumination management system of any one of claims 1 to 6 is disclosed, wherein the one or more processors are further configured to arrange the plurality of bounding volumes in a grid formation.

In Example 8, the bounding-volume based unmanned aerial vehicle illumination management system of claim 7 is disclosed, wherein the grid formation is a 2×2 grid.

In Example 9, the bounding-volume based unmanned aerial vehicle illumination management system of claim 7 is disclosed, wherein the grid formation is a 3×3 grid.

In Example 10, the bounding-volume based unmanned aerial vehicle illumination management system of claim 7 is disclosed, wherein the grid formation is a 4×4 grid.

In Example 11, the bounding-volume based unmanned aerial vehicle illumination management system of any one of claims 1 through 10 is disclosed, wherein the plurality of bounding volumes are bounding spheres.

In Example 12, the bounding-volume based unmanned aerial vehicle illumination management system of any one of claims 1 through 10 is disclosed, wherein the plurality of bounding volumes are bounding cubes.

In Example 13, the bounding-volume based unmanned aerial vehicle illumination management system of any one of claims 1 through 10 is disclosed, wherein the plurality of bounding volumes are bounding boxes.

In Example 14, the bounding-volume based unmanned aerial vehicle illumination management system of any one of claims 1 through 10 is disclosed, wherein the plurality of bounding volumes are bounding ellipsoids.

In Example 15, the bounding-volume based unmanned aerial vehicle illumination management system of any one of claims 1 through 10 is disclosed, wherein the plurality of bounding volumes are bounding capsules.

In Example 16, the bounding-volume based unmanned aerial vehicle illumination management system of any one of claims 1 through 10 is disclosed, wherein the plurality of bounding volumes are bounding cylinders.

In Example 17, the bounding-volume based unmanned aerial vehicle illumination management system of any one of claims 1 through 10 is disclosed, wherein the plurality of bounding volumes are two-dimensional.

In Example 18, the bounding-volume based unmanned aerial vehicle illumination management system of claim 17 is disclosed, wherein the plurality of bounding volumes are one of circles, squares, rectangles, triangles, hexagons, or octagons.

In Example 19, the bounding-volume based unmanned aerial vehicle illumination management system of any one of claims 1 through 18 is disclosed, wherein the unmanned aerial vehicle flight plan is a flight plan for an unmanned aerial vehicle light show.

In Example 20, the bounding-volume based unmanned aerial vehicle illumination management system of any one of claims 1 through 19 is disclosed, wherein the unmanned aerial vehicle lighting plan is a lighting plan for an unmanned aerial vehicle light show.

In Example 21, the bounding-volume based unmanned aerial vehicle illumination management system of any one of claims 1 through 20 is disclosed, wherein the combined lighting value is an average brightness of unmanned aerial vehicle lights corresponding to the subset of unmanned aerial vehicles.

In Example 22, the bounding-volume based unmanned aerial vehicle illumination management system of any one of claims 1 through 20 is disclosed, wherein the combined lighting value is a cumulative brightness of unmanned aerial vehicle lights corresponding to the subset of unmanned aerial vehicles.

In Example 23, the bounding-volume based unmanned aerial vehicle illumination management system of any one of claims 1 through 20 is disclosed, wherein the combined lighting value is a combined lighting color of unmanned aerial vehicle lights corresponding to the subset of unmanned aerial vehicles.

In Example 24, the bounding-volume based unmanned aerial vehicle illumination management system of any one of claims 1 through 20 is disclosed, wherein the combined lighting value is at least one of an average or cumulative brightness of unmanned aerial vehicle lights corresponding to the subset and a combined lighting color of unmanned aerial vehicle lights corresponding to the subset.

In Example 25, the bounding-volume based unmanned aerial vehicle illumination management system of any one of claims 2 through 24 is disclosed, wherein the estimated surface illumination is a determination of surface illumination along one or more regions of a map stored in the memory.

In Example 26, the bounding-volume based unmanned aerial vehicle illumination management system of any one of claims 1 through 25 is disclosed, wherein the one or more processors are further configured to determine a combined lighting value for a plurality of bounding volumes and determine an estimated surface illumination based on the plurality of bounding volumes.

In Example 27, the bounding-volume based unmanned aerial vehicle illumination management system of any one of claims 1 through 26 is disclosed, wherein the bounding volumes are defined relative to a plurality of unmanned aerial vehicles according to the unmanned aerial vehicle flight plan.

In Example 28, the bounding-volume based unmanned aerial vehicle illumination management system of any one of claims 1 through 26 is disclosed, wherein the bounding volumes are defined relative to a land region.

In Example 29, the bounding-volume based unmanned aerial vehicle illumination management system of any one of claims 1 through 26 is disclosed, wherein the bounding volumes are defined relative to a map.

In Example 30, a method of bounding-volume based unmanned aerial vehicle illumination management is disclosed, comprising defining a plurality of bounding volumes within a region of unmanned aerial vehicle flight; determining a subset of unmanned aerial vehicles within a bounding volume according to an unmanned aerial vehicle flight plan; determining a combined lighting value of the subset of unmanned aerial vehicles according to an unmanned aerial vehicle illumination plan; and determining a surface illumination corresponding to the combined lighting value of one or more bounding volumes.

In Example 31, the method of bounding-volume based unmanned aerial vehicle illumination management of claim 30 is disclosed is disclosed, further comprising storing at least one of a flight plan and a map in a memory.

In Example 32, the method of bounding-volume based unmanned aerial vehicle illumination management of claim 30 or 31 is disclosed is disclosed, further comprising modifying the unmanned aerial vehicle flight plan or the unmanned aerial vehicle lighting plan to cause an estimated surface illumination to approximate a predetermined surface illumination.

In Example 33, the method of bounding-volume based unmanned aerial vehicle illumination management of claim 32 is disclosed is disclosed, further comprising flying an unmanned aerial vehicle according to the modified unmanned aerial vehicle flight plan or the modified unmanned aerial vehicle lighting plan.

In Example 34, the method of bounding-volume based unmanned aerial vehicle illumination management of any one of claims 30 to 33 is disclosed is disclosed, further comprising associating the combined lighting value for the bounding volume with a bounding volume center or focus.

In Example 35, the method of bounding-volume based unmanned aerial vehicle illumination management of claim 34 is disclosed is disclosed, wherein the bounding volume center or focus is a single point.

In Example 36, the method of bounding-volume based unmanned aerial vehicle illumination management of any one of claims 30 to 35 is disclosed is disclosed, further comprising arranging the plurality of bounding volumes in a grid formation.

In Example 37, the method of bounding-volume based unmanned aerial vehicle illumination management of claim 36 is disclosed is disclosed, wherein the grid formation is a 2×2 grid.

In Example 38, the method of bounding-volume based unmanned aerial vehicle illumination management of claim 36 is disclosed is disclosed, wherein the grid formation is a 3×3 grid.

In Example 39, the method of bounding-volume based unmanned aerial vehicle illumination management of claim 36 is disclosed is disclosed, wherein the grid formation is a 4×4 grid.

In Example 40, the method of bounding-volume based unmanned aerial vehicle illumination management of any one of claims 30 through 39 is disclosed is disclosed, wherein the plurality of bounding volumes are bounding spheres.

In Example 41, the method of bounding-volume based unmanned aerial vehicle illumination management of any one of claims 30 through 39 is disclosed is disclosed, wherein the plurality of bounding volumes are bounding cubes.

In Example 42, the method of bounding-volume based unmanned aerial vehicle illumination management of any one of claims 30 through 39 is disclosed is disclosed, wherein the plurality of bounding volumes are bounding boxes.

In Example 43, the method of bounding-volume based unmanned aerial vehicle illumination management of any one of claims 30 through 39 is disclosed is disclosed, wherein the plurality of bounding volumes are bounding ellipsoids.

In Example 44, the method of bounding-volume based unmanned aerial vehicle illumination management of any one of claims 30 through 39 is disclosed is disclosed, wherein the plurality of bounding volumes are bounding capsules.

In Example 45, the method of bounding-volume based unmanned aerial vehicle illumination management of any one of claims 30 through 39 is disclosed is disclosed, wherein the plurality of bounding volumes are bounding cylinders.

In Example 46, the method of bounding-volume based unmanned aerial vehicle illumination management of any one of claims 30 through 39 is disclosed is disclosed, wherein the plurality of bounding volumes are two-dimensional.

In Example 47, the method of bounding-volume based unmanned aerial vehicle illumination management of claim 46 is disclosed is disclosed, wherein the plurality of bounding volumes are one of circles, squares, rectangles, triangles, hexagons, or octagons.

In Example 48, the method of bounding-volume based unmanned aerial vehicle illumination management of any one of claims 30 through 47 is disclosed is disclosed, wherein the unmanned aerial vehicle flight plan is a flight plan for an unmanned aerial vehicle light show.

In Example 49, the method of bounding-volume based unmanned aerial vehicle illumination management of any one of claims 30 through 48 is disclosed is disclosed, wherein the unmanned aerial vehicle lighting plan is a lighting plan for an unmanned aerial vehicle light show.

In Example 50, the method of bounding-volume based unmanned aerial vehicle illumination management of any one of claims 30 through 49 is disclosed is disclosed, wherein the combined lighting value is an average brightness of unmanned aerial vehicle lights corresponding to the subset of unmanned aerial vehicles.

In Example 51, the method of bounding-volume based unmanned aerial vehicle illumination management of any one of claims 30 through 50 is disclosed is disclosed, wherein the combined lighting value is a cumulative brightness of unmanned aerial vehicle lights corresponding to the subset of unmanned aerial vehicles.

In Example 52, the method of bounding-volume based unmanned aerial vehicle illumination management of any one of claims 30 through 51 is disclosed is disclosed, wherein the combined lighting value is a combined lighting color of unmanned aerial vehicle lights corresponding to the subset of unmanned aerial vehicles.

In Example 53, the method of bounding-volume based unmanned aerial vehicle illumination management of any one of claims 30 through 52 is disclosed is disclosed, wherein the combined lighting value is at least one of an average or cumulative brightness of unmanned aerial vehicle lights corresponding to the subset and a combined lighting color of unmanned aerial vehicle lights corresponding to the subset.

In Example 54, the method of bounding-volume based unmanned aerial vehicle illumination management of any one of claims 31 through 53 is disclosed is disclosed, wherein the estimated surface illumination is a determination of surface illumination along one or more regions of a map stored in the memory.

In Example 55, the method of bounding-volume based unmanned aerial vehicle illumination management of any one of claims 30 through 54 is disclosed is disclosed, further comprising determining a combined lighting value for a plurality of bounding volumes and determining an estimated surface illumination based on the plurality of bounding volumes.

In Example 56, the method of bounding-volume based unmanned aerial vehicle illumination management of any one of claims 30 through 55 is disclosed is disclosed, wherein the bounding volumes are defined relative to a plurality of unmanned aerial vehicles according to the unmanned aerial vehicle flight plan.

In Example 57, the method of bounding-volume based unmanned aerial vehicle illumination management of any one of claims 30 through 55 is disclosed is disclosed, wherein the bounding volumes are defined relative to a land region.

In Example 58, the method of bounding-volume based unmanned aerial vehicle illumination management of any one of claims 30 through 55 is disclosed is disclosed, wherein the bounding volumes are defined relative to a map.

In Example 59, a means for bounding-volume based unmanned aerial vehicle illumination management is disclosed, comprising one or more processing means, configured to define a plurality of bounding volumes within a region of unmanned aerial vehicle flight; determine a subset of unmanned aerial vehicles within a bounding volume according to an unmanned aerial vehicle flight plan; determine a combined lighting value of the subset of unmanned aerial vehicles according to an unmanned aerial vehicle illumination plan; and determine a surface illumination corresponding to the combined lighting value of one or more bounding volumes.

In Example 60, the means for bounding-volume based unmanned aerial vehicle illumination management of claim 59 is disclosed, further comprising a storing means, configured to store at least one of a flight plan and a map.

In Example 61, the means for bounding-volume based unmanned aerial vehicle illumination management of claim 59 or 60 is disclosed, wherein the one or more processing means are further configured to modify the unmanned aerial vehicle flight plan or the unmanned aerial vehicle lighting plan to cause an estimated surface illumination to approximate a predetermined surface illumination.

In Example 62, the means for bounding-volume based unmanned aerial vehicle illumination management of claim 61 is disclosed, further comprising flying an unmanned aerial vehicle according to the modified unmanned aerial vehicle flight plan or the modified unmanned aerial vehicle lighting plan.

In Example 63, the means for bounding-volume based unmanned aerial vehicle illumination management of any one of claims 59 to 62 is disclosed, wherein the one or more processing means are further configured to associate the combined lighting value for the bounding volume with a bounding volume center or focus.

In Example 64, the means for bounding-volume based unmanned aerial vehicle illumination management of claim 63 is disclosed, wherein the bounding volume center or focus is a single point.

In Example 65, the means for bounding-volume based unmanned aerial vehicle illumination management of any one of claims 59 to 64 is disclosed, wherein the one or more processing means are further configured to arrange the plurality of bounding volumes in a grid formation.

In Example 66, the means for bounding-volume based unmanned aerial vehicle illumination management of claim 65 is disclosed, wherein the grid formation is a 2×2 grid.

In Example 67, the means for bounding-volume based unmanned aerial vehicle illumination management of claim 65 is disclosed, wherein the grid formation is a 3×3 grid.

In Example 68, the means for bounding-volume based unmanned aerial vehicle illumination management of claim 65 is disclosed, wherein the grid formation is a 4×4 grid.

In Example 69, the means for bounding-volume based unmanned aerial vehicle illumination management of any one of claims 59 through 68 is disclosed, wherein the plurality of bounding volumes are bounding spheres.

In Example 70, the means for bounding-volume based unmanned aerial vehicle illumination management of any one of claims 59 through 68 is disclosed, wherein the plurality of bounding volumes are bounding cubes.

In Example 71, the means for bounding-volume based unmanned aerial vehicle illumination management of any one of claims 59 through 68 is disclosed, wherein the plurality of bounding volumes are bounding boxes.

In Example 72, the means for bounding-volume based unmanned aerial vehicle illumination management of any one of claims 59 through 68 is disclosed, wherein the plurality of bounding volumes are bounding ellipsoids.

In Example 73, the means for bounding-volume based unmanned aerial vehicle illumination management of any one of claims 59 through 68 is disclosed, wherein the plurality of bounding volumes are bounding capsules.

In Example 74, the means for bounding-volume based unmanned aerial vehicle illumination management of any one of claims 59 through 68 is disclosed, wherein the plurality of bounding volumes are bounding cylinders.

In Example 75, the means for bounding-volume based unmanned aerial vehicle illumination management of any one of claims 59 through 68 is disclosed, wherein the plurality of bounding volumes are two-dimensional.

In Example 76, the means for bounding-volume based unmanned aerial vehicle illumination management of claim 75 is disclosed, wherein the plurality of bounding volumes are one of circles, squares, rectangles, triangles, hexagons, or octagons.

In Example 77, the means for bounding-volume based unmanned aerial vehicle illumination management of any one of claims 59 through 76 is disclosed, wherein the unmanned aerial vehicle flight plan is a flight plan for an unmanned aerial vehicle light show.

In Example 78, the means for bounding-volume based unmanned aerial vehicle illumination management of any one of claims 59 through 77 is disclosed, wherein the unmanned aerial vehicle lighting plan is a lighting plan for an unmanned aerial vehicle light show.

In Example 79, the means for bounding-volume based unmanned aerial vehicle illumination management of any one of claims 59 through 78 is disclosed, wherein the combined lighting value is an average brightness of unmanned aerial vehicle lights corresponding to the subset of unmanned aerial vehicles.

In Example 80, the means for bounding-volume based unmanned aerial vehicle illumination management of any one of claims 59 through 78 is disclosed, wherein the combined lighting value is a cumulative brightness of unmanned aerial vehicle lights corresponding to the subset of unmanned aerial vehicles.

In Example 81, the means for bounding-volume based unmanned aerial vehicle illumination management of any one of claims 59 through 78 is disclosed, wherein the combined lighting value is a combined lighting color of unmanned aerial vehicle lights corresponding to the subset of unmanned aerial vehicles.

In Example 82, the means for bounding-volume based unmanned aerial vehicle illumination management of any one of claims 59 through 78 is disclosed, wherein the combined lighting value is at least one of an average or cumulative brightness of unmanned aerial vehicle lights corresponding to the subset and a combined lighting color of unmanned aerial vehicle lights corresponding to the sub set.

In Example 83, the means for bounding-volume based unmanned aerial vehicle illumination management of any one of claims 60 through 82 is disclosed, wherein the estimated surface illumination is a determination of surface illumination along one or more regions of a map stored in the storing means.

In Example 84, the means for bounding-volume based unmanned aerial vehicle illumination management of any one of claims 59 through 83 is disclosed, wherein the one or more processing means are further configured to determine a combined lighting value for a plurality of bounding volumes and determine an estimated surface illumination based on the plurality of bounding volumes.

In Example 85, the means for bounding-volume based unmanned aerial vehicle illumination management of any one of claims 59 through 84 is disclosed, wherein the bounding volumes are defined relative to a plurality of unmanned aerial vehicles according to the unmanned aerial vehicle flight plan.

In Example 86, the means for bounding-volume based unmanned aerial vehicle illumination management of any one of claims 59 through 84 is disclosed, wherein the bounding volumes are defined relative to a land region.

In Example 87, the means for bounding-volume based unmanned aerial vehicle illumination management of any one of claims 59 through 84 is disclosed, wherein the bounding volumes are defined relative to a map.

In Example 88, a non-transitive computer readable medium containing program instructions is disclosed for causing a computer to perform the steps of defining a plurality of bounding volumes within a region of unmanned aerial vehicle flight; determining a subset of unmanned aerial vehicles within a bounding volume according to an unmanned aerial vehicle flight plan; determining a combined lighting value of the subset of unmanned aerial vehicles according to an unmanned aerial vehicle illumination plan; and determining a surface illumination corresponding to the combined lighting value of one or more bounding volumes.

In Example 89, a non-transitive computer readable medium is disclosed containing program instructions for causing a computer to perform the any of the methods of claims 30 through 58.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A bounding-volume based unmanned aerial vehicle illumination management system comprising:
    one or more processors, configured to
        define a plurality of bounding volumes within a region of unmanned aerial vehicle flight;
        determine a subset of unmanned aerial vehicles within a bounding volume according to an unmanned aerial vehicle flight plan;
        determine a combined lighting value of the subset of unmanned aerial vehicles according to an unmanned aerial vehicle illumination plan; and
        determine a surface illumination corresponding to the combined lighting value of one or more bounding volumes; and
        send a signal comprising data representing a modification of the unmanned aerial vehicle flight plan or a modification of an unmanned aerial vehicle lighting instruction based on the determined surface illumination.

2. The bounding-volume based unmanned aerial vehicle illumination management system of claim 1, wherein the modification of the unmanned aerial vehicle flight plan or the modification of an unmanned aerial vehicle lighting instruction is selected to cause an estimated surface illumination to approximate a predetermined surface illumination.

3. The bounding-volume based unmanned aerial vehicle illumination management system of claim 2, further comprising flying an unmanned aerial vehicle according to the modified unmanned aerial vehicle flight plan or the modified unmanned aerial vehicle lighting plan.

4. The bounding-volume based unmanned aerial vehicle illumination management system of claim 1, wherein the one or more processors are further configured to associate the combined lighting value for the bounding volume with a bounding volume center or focus.

5. The bounding-volume based unmanned aerial vehicle illumination management system of claim 1, wherein the one or more processors are further configured to arrange the plurality of bounding volumes in a grid formation.

6. The bounding-volume based unmanned aerial vehicle illumination management system of claim 1, wherein the plurality of bounding volumes are bounding spheres.

7. The bounding-volume based unmanned aerial vehicle illumination management system of claim 1, wherein the plurality of bounding volumes are bounding boxes.

8. The bounding-volume based unmanned aerial vehicle illumination management system of claim 1, wherein the unmanned aerial vehicle flight plan is a flight plan for an unmanned aerial vehicle light show.

9. The bounding-volume based unmanned aerial vehicle illumination management system of claim 1, wherein the unmanned aerial vehicle lighting plan is a lighting plan for an unmanned aerial vehicle light show.

10. The bounding-volume based unmanned aerial vehicle illumination management system of claim 1, wherein the combined lighting value is an average brightness of unmanned aerial vehicle lights corresponding to the subset of unmanned aerial vehicles.

11. The bounding-volume based unmanned aerial vehicle illumination management system of claim 1, wherein the combined lighting value is a combined lighting color of unmanned aerial vehicle lights corresponding to the subset of unmanned aerial vehicles.

12. The bounding-volume based unmanned aerial vehicle illumination management system of claim 1, wherein the modification is a modification of the unmanned aerial vehicle flight plan, and the modification comprises a shift in a location of an unmanned aerial vehicle, a change in shape of an unmanned aerial vehicle pattern, a rotation of an unmanned aerial vehicle pattern, or a change of a concentration of unmanned aerial vehicles.

13. The bounding-volume based unmanned aerial vehicle illumination management system of claim 1, wherein the modification is a modification of the unmanned aerial vehicle lighting instruction, and the modification comprises a change of lighting instructions for an unmanned aerial vehicle or a change of lighting color for an unmanned aerial vehicle.

14. A method of bounding-volume based unmanned aerial vehicle illumination management comprising:
    defining a plurality of bounding volumes within a region of unmanned aerial vehicle flight;
    determining a subset of unmanned aerial vehicles within a bounding volume according to an unmanned aerial vehicle flight plan;
    determining a combined lighting value of the subset of unmanned aerial vehicles according to an unmanned aerial vehicle illumination plan; and
    determining a surface illumination corresponding to the combined lighting value of one or more bounding volumes; and
    sending a signal representing a modification of the unmanned aerial vehicle flight plan or a modification of an unmanned aerial vehicle lighting instruction based on the determined surface illumination.

15. The method of bounding-volume based unmanned aerial vehicle illumination management of claim 14, further comprising modifying the unmanned aerial vehicle flight plan or the unmanned aerial vehicle lighting plan to cause an estimated surface illumination to approximate a predetermined surface illumination.

16. The method of bounding-volume based unmanned aerial vehicle illumination management of claim 15, further comprising flying an unmanned aerial vehicle according to the modified unmanned aerial vehicle flight plan or the modified unmanned aerial vehicle lighting plan.

17. The method of bounding-volume based unmanned aerial vehicle illumination management of claim 14, further comprising associating the combined lighting value for the bounding volume with a bounding volume center or focus.

18. A means for bounding-volume based unmanned aerial vehicle illumination management comprising:
   one or more processing means, configured to
      define a plurality of bounding volumes within a region of unmanned aerial vehicle flight;
      determine a subset of unmanned aerial vehicles within a bounding volume according to an unmanned aerial vehicle flight plan;
      determine a combined lighting value of the subset of unmanned aerial vehicles according to an unmanned aerial vehicle illumination plan; and
      determine a surface illumination corresponding to the combined lighting value of one or more bounding volumes; and
      send a signal representing a modification of the unmanned aerial vehicle flight plan or a modification of an unmanned aerial vehicle lighting instruction based on the determined surface illumination.

19. The means for bounding-volume based unmanned aerial vehicle illumination management of claim 18, wherein the one or more processing means are further configured to modify the unmanned aerial vehicle flight plan or the unmanned aerial vehicle lighting plan to cause an estimated surface illumination to approximate a predetermined surface illumination.

* * * * *